United States Patent
Park et al.

(10) Patent No.: US 8,767,602 B2
(45) Date of Patent: Jul. 1, 2014

(54) METHOD OF TRANSMITTING MESSAGE RELIABLY IN POWER SAVING CLASS MODE

(75) Inventors: Gi Won Park, Anyang-si (KR); Yong Ho Kim, Anyang-si (KR); Ki Seon Ryu, Anyang-si (KR)

(73) Assignee: LG Electronics Inc., Seoul (KE)

( * ) Notice: Subject to any disclaimer, the term of this patent is extended or adjusted under 35 U.S.C. 154(b) by 230 days.

(21) Appl. No.: 13/142,832

(22) PCT Filed: Feb. 2, 2010

(86) PCT No.: PCT/KR2010/000624
§ 371 (c)(1),
(2), (4) Date: Jun. 29, 2011

(87) PCT Pub. No.: WO2010/087680
PCT Pub. Date: Aug. 5, 2010

(65) Prior Publication Data
US 2012/0014245 A1      Jan. 19, 2012

Related U.S. Application Data

(60) Provisional application No. 61/149,314, filed on Feb. 2, 2009, provisional application No. 61/155,165, filed on Feb. 25, 2009, provisional application No. 61/168,616, filed on Apr. 12, 2009.

(30) Foreign Application Priority Data

Jul. 3, 2009  (KR) .................. 10-2009-0060763

(51) Int. Cl.
*G08C 17/00*   (2006.01)

(52) U.S. Cl.
USPC ........................................ 370/311; 370/329

(58) Field of Classification Search
USPC ................................................ 370/311, 329
See application file for complete search history.

(56) References Cited

U.S. PATENT DOCUMENTS

| | | | |
|---|---|---|---|
| 7,810,009 B2 * | 10/2010 | Kwon et al. | 714/749 |
| 2007/0076639 A1 | 4/2007 | Chou | |
| 2007/0300120 A1 * | 12/2007 | Kim et al. | 714/749 |

(Continued)

FOREIGN PATENT DOCUMENTS

| | | |
|---|---|---|
| CN | 1882165 | 12/2006 |
| CN | 101247655 | 8/2008 |
| CN | 101999211 | 3/2011 |
| KR | 1020060039843 | 5/2006 |
| KR | 1020080026012 | 3/2008 |
| WO | 2008/094017 | 8/2008 |

OTHER PUBLICATIONS

Zhou et al., "Performance Analysis of Power Saving Mechanism with Adjustable DRX Cycles in 3GPP LTE", IEEE VTC 2008-fall, pp. 1-5, Sep. 2008.

(Continued)

*Primary Examiner* — Jason Mattis
(74) *Attorney, Agent, or Firm* — Lee, Hong, Degerman, Kang & Waimey

(57) ABSTRACT

Various methods and apparatuses for reliably transmitting or receiving messages and data in a Power Saving Class (PSC) mode, which are applicable to a wireless access system, are disclosed. In addition, various methods and apparatuses for retransmitting a management message (e.g., a control message) in the PSC mode are disclosed. Accordingly, the messages and data can be transmitted using a Hybrid Automatic Repeat reQuest (HARQ) scheme.

16 Claims, 11 Drawing Sheets

(56) References Cited

U.S. PATENT DOCUMENTS

| | | |
|---|---|---|
| 2008/0186892 A1 | 8/2008 | Damnjanovic |
| 2008/0186893 A1 | 8/2008 | Kolding et al. |
| 2008/0219204 A1* | 9/2008 | Lee et al. ............... 370/315 |
| 2010/0008278 A1* | 1/2010 | Kone et al. ............. 370/311 |
| 2010/0220641 A1* | 9/2010 | Son et al. ............... 370/311 |
| 2011/0002253 A1* | 1/2011 | Cha et al. ............... 370/311 |

OTHER PUBLICATIONS

The State Intellectual Property Office of the People's Republic of China Application Serial No. 201080006203.1, Office Action dated Jun. 28, 2013, 6 pages.

* cited by examiner (a)

(b)

METHOD OF TRANSMITTING MESSAGE RELIABLY IN POWER SAVING CLASS MODE

CROSS-REFERENCE TO RELATED APPLICATIONS

This application is the National Stage filing under 35 U.S.C. 371 of International Application No. PCT/KR2010/000624, filed on Feb. 2, 2010, which claims the benefit of earlier filing date and right of priority to Korean Application No. 10-2009-0060763, filed on Jul. 3, 2009, and also claims the benefit of U.S. Provisional Application Ser. Nos. 61/168,616, filed on Apr. 12, 2009, 61/155,165, filed on Feb. 25, 2009, and 61/149,314, filed on Feb. 2, 2009, the contents of which are all incorporated by reference herein in their entirety.

TECHNICAL FIELD

The present invention relates to a method of reliably transmitting or receiving a message and data in a Power Saving Class (PSC) mode, which is applicable to a wireless access system.

BACKGROUND ART

Hereinafter, a Power Saving Class (PSC) mode of a mobile station will be briefly described.

In a broadband wireless access system based on the IEEE 802.16e system, a PSC mode (for example, a sleep mode or an idle mode) for minimizing power consumption of a mobile station is supported. In the PSC mode, the operation of the mobile station is performed by the repetition of a sleep interval and a listening interval. The length of the sleep interval determined by a sleep window value and the length of the listening interval determined by a listening window value have different values according to traffic characteristics prescribed in a corresponding mobile station. Therefore, the mobile station may have the following three PSC modes according to the traffic characteristics which are currently prescribed.

That is, the mobile station is able to support Power Saving Mode Class of type 1, Power Saving Mode Class of type 2 and Power Saving Class of type 3.

The Power Saving Mode Class of type 1 is a class for a non-real-time variable rate (nrt-VR) service, transfer rate of which is variable, or a Best Effect (BE) having conventional Internet traffic characteristics. The Power Saving Mode Class of type 1 is operated by defining an initial sleep window, a final window base, a final window exponent, a listening window, and a start frame number for a sleep window.

The Power Saving Mode Class of type 2 is a class for a VoIP service or a real-time variable rate (rt-VR) service, transfer rate of which is variable. The Power Saving Mode Class of type 2 is operated by defining an initial sleep window, a listening window, and a start frame number for a sleep window.

The Power Saving Mode Class of type 3 is a class for a management message (e.g., DCD/UCD and MOB_NBR-ADV) which must be periodically transmitted to a mobile station in a power saving mode or multicast-transmission data. The Power Saving Mode Class of type 3 is operated by defining a final window base, a final window exponent, and a start frame number for a sleep window.

Hereinafter, a data retransmission method which is generally used at a transmission end and a reception end will be briefly described.

In the wireless access system, a high-speed data service is provided using restricted resources. An automatic retransmission request method for efficiently using resources is used. That is, if transmission failure occurs during data transmission, a reception end requests data retransmission. At this time, an Automatic Repeat reQuest (ARQ) scheme is generally as the automatic retransmission request scheme.

In the ARQ scheme, after a reception end receives data, the reception end notifies a transmission end of whether or not the reception end has successfully received data through an Acknowledgement/Non-Acknowledgement (ACK/NACK) signal, and the transmission end retransmits data related to the signal when a NACK signal is received. The ARQ scheme includes three schemes: a Stop-And-Wait (SAW) ARQ scheme, a Go-Back-N (GBN) ARQ scheme and a Selective-Repeat (SR) ARQ scheme.

If data is transmitted in a packet format, a high data rate is required. Accordingly, a coding rate or a modulation method of a level corresponding to the high data rate has also been applied to the communication system in order to prevent errors occurring in high-speed transmission environments. In addition, there has been a need to provide an ARQ scheme suitable for high-speed transmission environments. Thus, a Hybrid ARQ (HARQ) scheme has been suggested.

In the ARQ scheme, information is discarded when an error occurs in the information. However, in the HARQ scheme, the receiving end stores information in which an error has occurred in a buffer and then combines the stored information with information for retransmission to apply Forward Error Correction (FEC). That is, the HARQ scheme can be considered as a combination of the ARQ scheme with FEC. The HARQ scheme may be roughly divided into the following four types.

In the first type of HARQ scheme, the receiving end always checks an error detection code included in data to preferentially apply the FEC scheme. When a received packet contains an error, the receiving end requests that the transmitting end retransmit the received packet. The receiving end discards the erroneous packet and the transmitting end uses the same FEC code as that of the discarded packet to retransmit the packet.

The second type of HARQ scheme is referred to as an "Incremental Redundancy (IR) ARQ scheme". In the IR ARQ scheme, the receiving end stores an initially transmitted packet in a buffer without discarding the packet and then combines the stored packet with redundancy bits included in the retransmitted packet. During retransmission, the transmitting end retransmits only parity bits excluding data bits. The transmitting end uses different parity bits every retransmission.

The third type of HARQ scheme is a special case of the second type. Each packet is self-decodable. When the transmitting end performs retransmission, the transmitting end constructs and retransmits a packet including both data and an erroneous portion. Although this scheme enables more correct decoding than the second type, the efficiency of coding gain is low.

The fourth type of HARQ scheme provides a function to store data initially received by the receiving end and combine the stored data with retransmitted data in addition to the functions of the first type. The fourth type of HARQ scheme is also referred to as "metric combining" or "chase combining". The fourth type of HARQ scheme has an excellent Signal to Interference Noise Ratio (SINR) and always uses the same parity bits of data to be retransmitted.

In the wireless access system, ARQ and HARQ may be simultaneously used. Data to be transmitted by the transmitting end with the ARQ is transferred to the receiving end with the HARQ through the HARQ of the transmitting end. Data which is successfully received by the receiving end is transferred to the receiving end with the ARQ.

DISCLOSURE OF INVENTION

Technical Problem

In order to enable a mobile station and a base station to reliably transmit or receive a Medium Access Control (MAC) management message or MAC data (e.g., MAC PDU) in a PSC mode, the HARQ scheme may be employed. If the MAC management message and/or the MAC data has not been successfully transmitted or received before a message timer prescribed by the mobile station and the base station or a sleep interval expires, the MAC management message and/or the MAC data may be transmitted after being delayed to a next listening interval or transmission failure thereof may occur.

An object of the present invention devised to solve the problem lies on a method of reliably transmitting or receiving a Medium Access Control (MAC) management message and/or a MAC message in a Power Saving Class (PSC) mode.

Another object of the present invention devised to solve the problem lies on a method of extending a listening interval so as to rapidly retransmit a failed Hybrid Automatic Repeat reQuest (HARQ) burst if a HARQ scheme is applied in a PSC mode.

A further object of the present invention devised to solve the problem lies on a method of operating timers used in a fast retransmission scheme if the fast retransmission scheme is applied in a PSC mode.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The object of the present invention can be achieved by providing various methods of reliably transmitting or receiving messages or data in a Power Saving Class (PSC) mode, which is applicable to a wireless access system.

In a first embodiment of the present invention, a mobile station and a base station may negotiate whether or not a fast retransmission scheme is supported using various messages. For example, the mobile station and the base station may negotiate whether or not to support the fast retransmission scheme which will be used in a sleep mode using a Subscribe station Basic Capability negotiation REQuest/ReSPonse (e.g. SBC-REQ/RSP) message used in initial access, a SLeep REQuest/ReSPonse (SLP-REQ/RSP) message, a Medium Access Control (MAC) extended subheader, an A-MAP message, a fragment subheader or the like.

After negotiating whether or not the fast retransmission scheme is supported, the mobile station and the base station may transmit or receive MAC management messages supported by an IEEE 802.16 system, a 3GPP LTE system or a 3GPP LTE-A system using the fast retransmission method based on a HARQ process. That is, the mobile station and the base station (see FIG. 12) used in the embodiments of the present invention may perform the operations of the methods shown in FIGS. 2 to 11 which will be described later.

In a second embodiment of the present invention, provided herein is a method of retransmitting a management message in a Power Saving Class (PSC) mode, the method including: at a mobile station, transmitting a first message including a first field indicating whether or not a fast retransmission scheme is supported to a base station; at the mobile station, receiving a second message including a second field indicating whether or not the fast retransmission scheme is supported from the base station; transmitting the management message to the base station in a listening window of the PSC mode using a Hybrid Automatic Repeat reQuest (HARQ) scheme; and retransmitting the management message to the base station using the fast retransmission scheme if the transmission of the management message using the HARQ scheme has failed. At this time, the fast retransmission scheme further extends the listening window so as to immediately retransmit the management message, when the transmission of the management message using the HARQ scheme has failed.

In the second embodiment, the first message may be one of a Subscribe station Basic Capability REQuest (SBC-REQ) message, a REGistration REQuest (REG-REQ) message, and a SLeep REQuest (SLP-REQ) message. The second message may be one of a Subscriber station Basic Capability ReSPonse (SBC-RSP) message, a REGistration ReSPponse (REG-RSP) message and a SLeep RESponse (SLP-RSP) message corresponding to the first message.

In the second embodiment, the first message and the second message may further include a first time (e.g., an extension time duration) field indicating an extension time duration of the listening window. At this time, the retransmitting of the management message may include, at the mobile station, extending the listening window by the time duration indicated by the extension time duration field and retransmitting the management message.

In the second embodiment, the first message and the second message may further include a second time (e.g., a Nextension) field indicating an extension time duration of the listening window in order to retransmit the management message using the HARQ scheme.

In a third embodiment of the present invention, provided herein is a method of retransmitting a management message in a Power Saving Class (PSC) mode, the method including: at a base station, receiving a first message including a first field indicating whether or not a fast retransmission scheme is supported from a mobile station; at the base station, transmitting a second message including a second field indicating whether or not the fast retransmission scheme is supported to the mobile station; transmitting the management message to the mobile station in a listening window of the mobile station in the PSC mode using a Hybrid Automatic Repeat reQuest (HARQ) scheme; and retransmitting the management message to the mobile station using the fast retransmission scheme if the transmission of the management message using the HARQ scheme has failed. The fast retransmission scheme further extends the listening window so as to immediately retransmit the management message, when the transmission of the management message using the HARQ scheme has failed.

In the third embodiment, the first message may be one of a Subscribe station Basic Capability REQuest (SBC-REQ) message, a REGistration REQuest (REG-REQ) message, and a SLeep REQuest (SLP-REQ) message, and the second message may be one of a Subscribe station Basic Capability ReSPonse (SBC-RSP) message, a REGistration ReSPonse (REG-RSP) message and a SLeep ReSPonse (SLP-RSP) message corresponding to the first message.

The first message and the second message may further include a first time (e.g., an extension time duration) field indicating an extension time duration of the listening window. At this time, the retransmission of the management message may include, at the mobile station, extending the listening window by the time duration indicated by the extension time duration field and retransmitting the management message.

In the third embodiment, the first message and the second message may further include a second time (e.g., an Nextension) field indicating an extension time duration of the listening window in order to retransmit the management message using the HARQ scheme.

A mobile station and a base station may negotiate whether or not a fast retransmission scheme is supported using various messages. For example, the mobile station and the base station may negotiate whether or not to support the fast retransmission scheme which will be used in a sleep mode using a Subscriber station Basic Capability negotiation REQuest/ReSPonse (SBC-REQ/RSP) message used in initial access, a SLeep REQuest/ReSPonse (SLP-REQ/RSP) message, a Medium Access Control (MAC) extended subheader, an A-MAP message, a fragment subheader or the like.

After negotiating whether or not the fast retransmission scheme is supported, the mobile station and the base station may transmit or receive MAC management messages supported by an IEEE 802.16 system, a 3GPP LTE system, or a 3GPP LTE-A system using the fast retransmission method based on a HARQ process.

In the embodiments of the present invention, the PSC mode may be one of an idle mode or a sleep mode. In this case, the first message may be a deregistration request message and the second message may be a deregistration command message. In addition, the listening window may be called a normal mode operation window.

The first to third embodiments are only examples of the preferred embodiments of the present invention, and various embodiments to which the technical features of the present invention are applicable are derived and understood by those skilled in the art from the detailed description of the present invention.

Advantageous Effects of Invention

The embodiments of the present invention have the following effects.

First, a mobile station and a base station can reliably transmit or receive a Medium Access Control (MAC) management message and/or a MAC message in a Power Saving Class (PSC) mode.

Second, the mobile station and the base station can extend a listening window so as to rapidly retransmit failed Hybrid Automatic Repeat reQuest (HARQ) burst, in the case where a HARQ scheme is applied in the PSC mode.

The effects obtained by the embodiments of the present invention are not limited to the above-described effects, and other effects thereof will be more clearly derived and understood by those skilled in the art from the detailed description of the embodiments of the present invention. That is, the other effects of the present invention will also be derived by those skilled in the art from the embodiments of the present invention.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
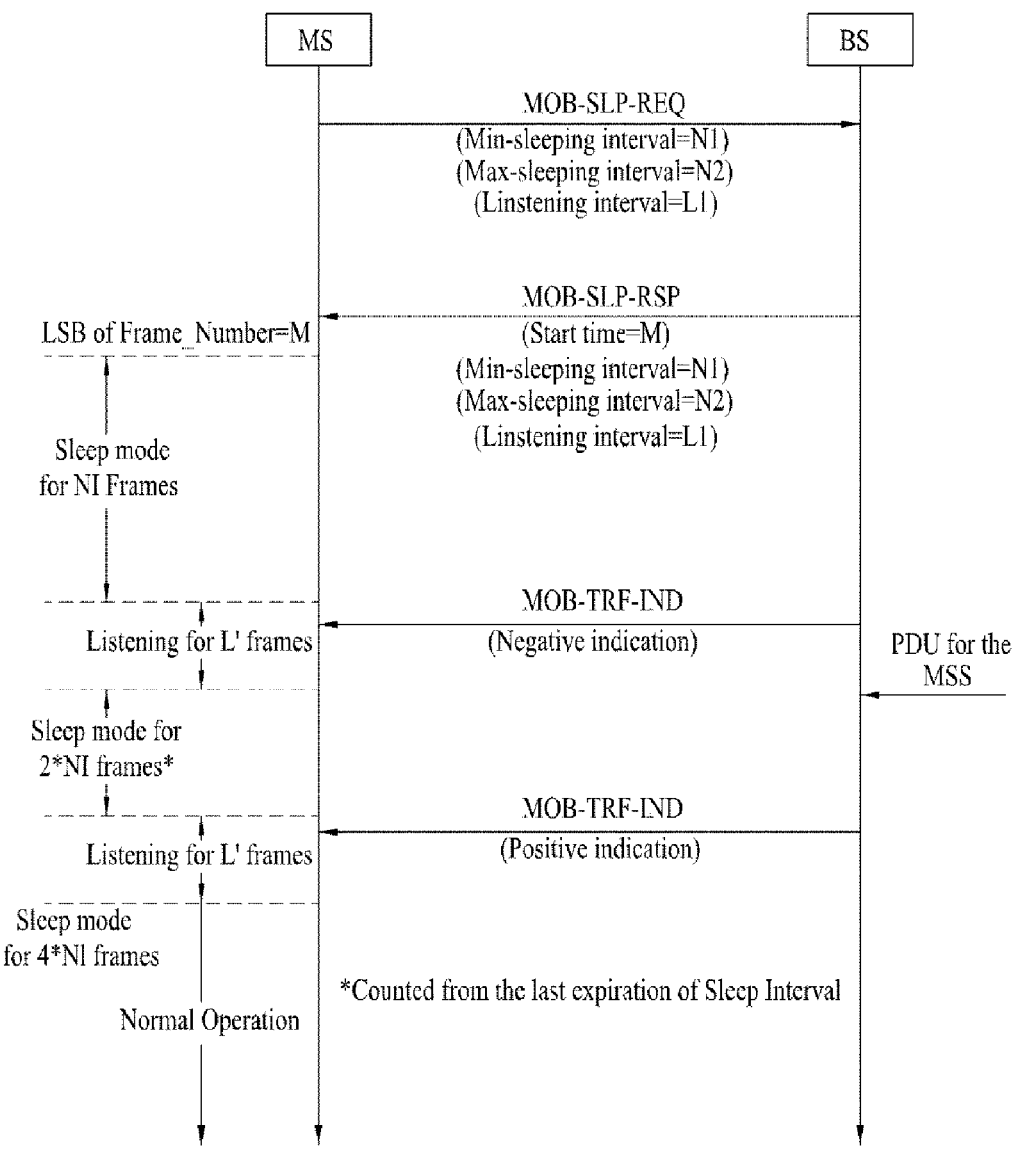
FIG. 1 is a diagram showing a procedure of performing Power Saving Mode Class of type 1.

The present invention relates to a wireless access system. In particular, hereinafter, methods of reliably transmitting or receiving a Medium Access Control (MAC) management message and data in a Power Saving Class (PSC) mode, which is applicable to a wireless access system, will be described.

The following embodiments are proposed by combining constituent components and characteristics of the present invention according to a predetermined format. The individual constituent components or characteristics should be considered to be optional on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In the description of the drawings, procedures or steps which render the scope of the present invention unnecessarily ambiguous will be omitted and procedures or steps which can be understood by those skilled in the art will be omitted.

The embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or network nodes other than the base station. The term "Base Station" may be replaced with the terms fixed station, Node-B, eNode-B (eNB), Advanced Base Station (ABS) or access point as necessary. The term "mobile station (MS)" may also be replaced with the term user equipment (UE), Subscriber Station (SS), Mobile Subscriber Station (MSS), Advanced Mobile Station (AMS) or mobile terminal as necessary.

The embodiments of the present invention can be supported by the standard documents disclosed in any one of wireless access systems, such as an IEEE 802 system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents. In addition, all the terms disclosed in the present document may be described by the above standard documents. In particular, the embodiments of the present invention may be supported by at least one of P802.16-2004, P802.16e-2005, P802.16Rev2, and P802.16e-2009, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

It should be noted that specific terms disclosed in the embodiments of the present invention are proposed for convenience of description and better understanding of the present invention, and the use of these specific terms may be changed to another format within the technical scope or spirit of the present invention.

FIG. 1 is a diagram showing a procedure of performing Power Saving Mode Class of type 1.

In the embodiment of FIG. 1, in the case of Power Saving Mode Class of type 1, a mobile station requests activation of a Power Saving Class (PSC) mode to a base station. In this case, if downlink traffic occurs in the corresponding mobile station, the PSC mode is deactivated. Detailed descriptions of individual operations are as follows.

The mobile station sets a variety of values such as an initial sleep window, a final sleep window, and a listening window in a SLeep REQuest (SLP-REQ) message, transmits the sleep request message to the base station, and requests activation of the PSC mode. If the base station permits activation of the PSC mode of the mobile station, the base station transmits a SLeep ReSPonse (SLP-RSP) message, in which the initial sleep window, the final sleep window, the listening window, and the start frame number for a sleep window have been defined, to the mobile station.

When a PSC start time has been reached, the mobile station maintains a sleep interval having the same time as the initial sleep window. When the initial sleep interval expires, the mobile station receives a traffic indication (TRF-IND) message from the base station during a subsequent listening interval. If no downlink traffic is being transmitted to the mobile station (negative indication), the mobile station maintains the PSC mode during a period that is twice as long as the initial sleep window.

The sleep interval is continuously increased according to the aforementioned equation (i.e. the next sleep interval is set to be twice as long as the previous sleep interval). The size of the final sleep interval is set using a final sleep window base and a final window exponent included in the sleep response message as shown in Math Figure 1.

$$\text{Final sleep window} = \text{final sleep window base} * 2^{\text{final window exponent}} \quad \text{[Math Figure 1]}$$

In contrast, if the mobile station receives a traffic indication message that there is downlink traffic being transmitted to the mobile station during the listening interval (positive indication), the PSC mode is deactivated.

Figure 2:
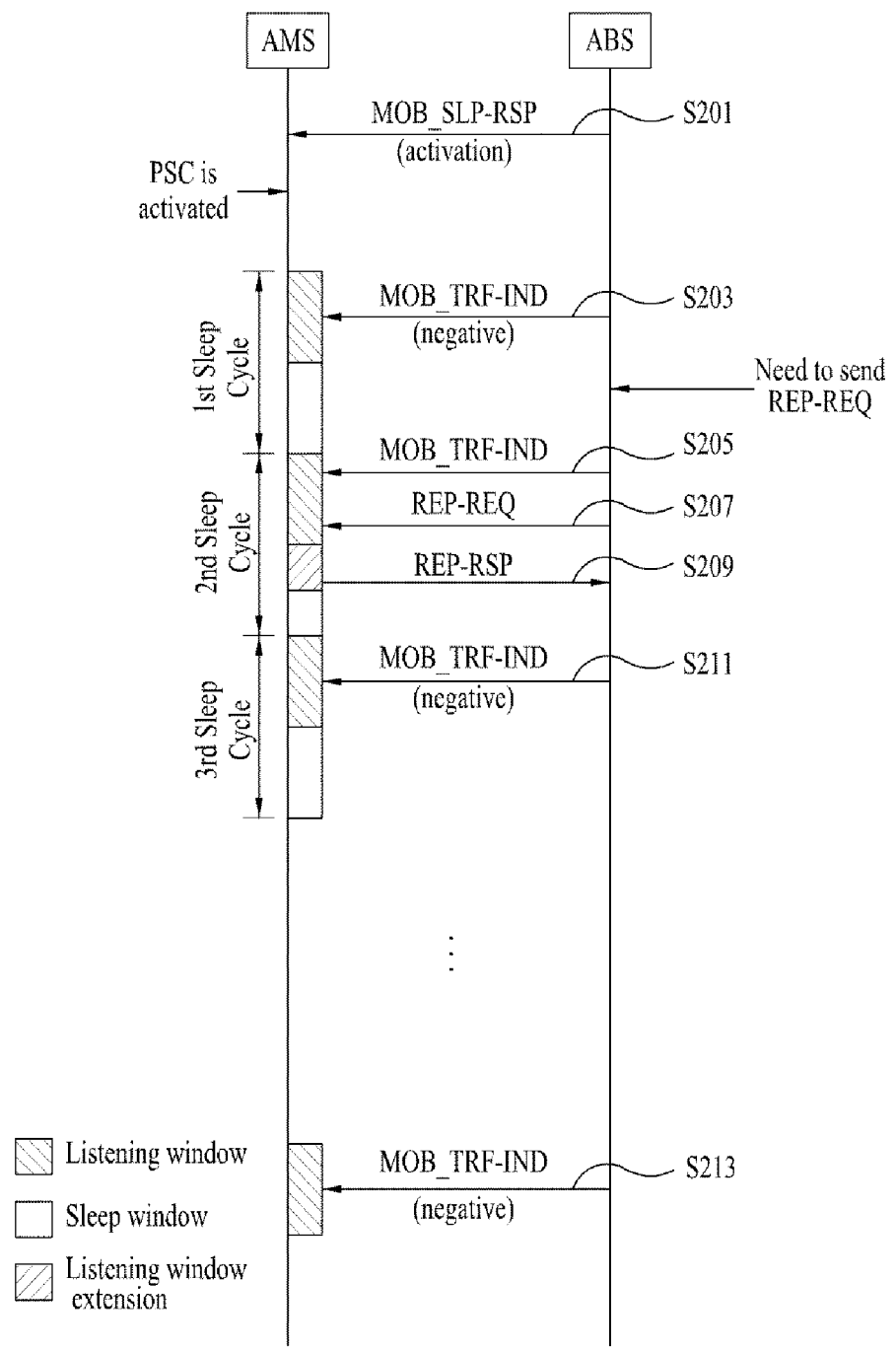
FIG. 2 is a diagram showing one method of extending a listening interval.

FIG. 2 is a diagram showing one method of extending a listening interval.

Referring to FIG. 2, in an IEEE 802.16m network, the listening interval of a mobile station may be extended, in order to enable a base station to transmit an uplink or downlink Medium Access Control (MAC) management message to the mobile station in a sleep mode. That is, the mobile station may be disabled to deactivate the sleep mode in order to receive the MAC management message.

The base station may extend the listening interval of the mobile station to transmit the MAC management message such that the mobile station is disabled to deactivate the sleep mode in order to receive the MAC management message. In addition, in the IEEE 802.16m standard, a sleep cycle includes a listening window and a sleep window.

FIG. 2 shows the case where the listening interval is extended in order to enable the mobile station to transmit the MAC management message in uplink. That is, in FIG. 2, an Advanced Mobile Station (AMS) may receive a SLeep ReSPonse (SLP-RSP) message from an Advanced Base Station (ABS) so as to activate the PSC mode.

The ABS may transmit a TFaFfic INDication (TRF-IND) message to the AMS in the listening window of a first sleep cycle. At this time, if there is no downlink traffic transmitted to the AMS, the ABS may negatively set a traffic indication field of the TRF-IND message and transmit the TRF-IND message to the AMS (S203).

In the case where the ABS needs to transmit a report request (REP-REQ) message as one of MAC management message, the ABS transmits the traffic indication message and then transmits the report request message to the AMS (S205 and S207).

The AMS which receives the report request message may transmit a REPort ReSPonse (REP-RSP) message to the ABS. At this time, since the traffic indication field included in the traffic indication message is negatively set, the AMS does not awake from the sleep mode. However, in order to transmit the report response message in the sleep mode, the listening window may be extended to a predetermined time and the report response message may be transmitted (S209).

Thereafter, the ABS may periodically transmit a traffic indication message so as to notify the AMS in the sleep mode of whether or not there is downlink traffic (S211 and S213).

As shown in FIG. 2, the listening window of the sleep mode may be extended to a predetermined degree within the sleep cycle. However, if the MAC management message is transmitted or received between the AMS and the ABS using a HARQ scheme, the MAC management message may not be successfully transmitted or received before a predetermined timer expires. In this case, a method of finishing the HARQ process and enabling a transmission end (AMS or ABS) for transmitting the MAC management message to start retransmission of a message fragment of a failed HARQ burst or a complete message is necessary.

For example, in the case where the ABS and the AMS transmit or receive the MAC management message using the HARQ scheme and the HARQ process of the MAC management message is not successfully finished by the ABS and the AMS, the listening window may be extended and the message fragment of the failed HARQ burst or the complete message may be transmitted using a fast retransmission scheme.

Hereinafter, in the embodiments of the present invention, a process of negotiating whether or not the fast retransmission scheme is applied to the MAC management message between the AMS and the ABS will be described in detail.

<Method of Negotiating Whether or not a Fast Retransmission Scheme is Applied>

Figure 3:
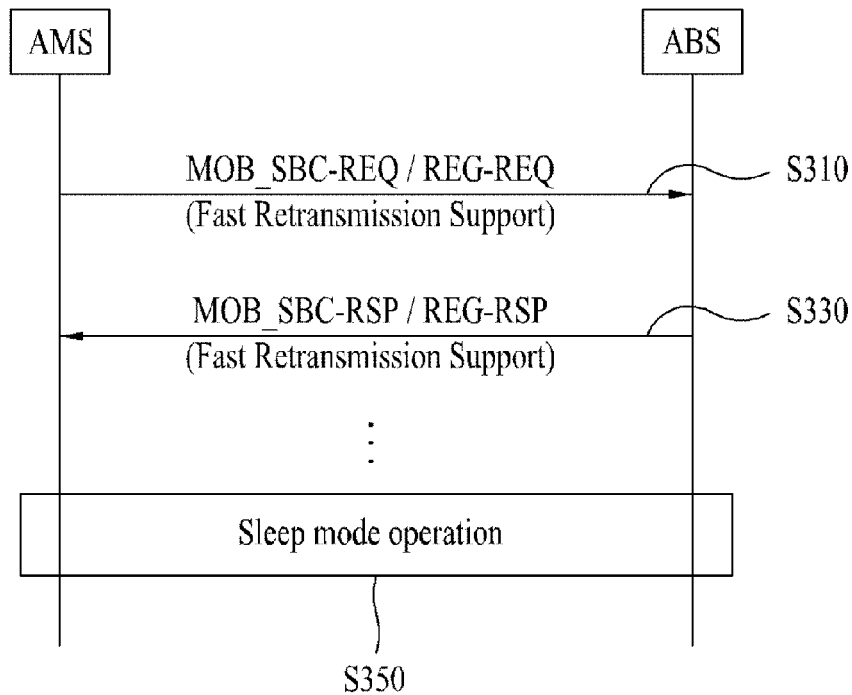
FIG. 3 is a diagram showing one method of negotiating whether or not a fast retransmission scheme is applied according to an embodiment of the present invention.

FIG. 3 is a diagram showing one method of negotiating whether or not a fast retransmission scheme is applied according to an embodiment of the present invention.

In the embodiments of the present invention, a fast retransmission support field is newly defined.

An Advanced Mobile Station (AMS) and an Advanced Base Station (ABS) may indicate whether or not fast retransmission of a MAC management message is performed if a HARQ process of a MAC management message is not successfully finished through a fast retransmission support field.

Referring to FIG. 3, the AMS may include the fast retransmission support field in a Subscriber station Basic Capability negotiation REQuest (MOB_SBC-REQ) message or a REGistration REQuest (REG-REQ) message in a basic capability negotiation process or a registration process, respectively and transmit the basic capability negotiation request message or the registration request message to the ABS. If the fast retransmission scheme is supported, the listening window is implicitly extended (S310).

In step S310, the basic capability negotiation request message or the registration request message may selectively include an extension time duration field indicating the time duration of the listening window extension for retransmission of a failed HARQ burst, and an Nextension field indicating the length of the frame of extension of the listening window if an NACK message is transmitted.

Table 1 shows an example of the Subscriber station Basic Capability negotiation REQuest (MOB_SBC-REQ) message available in the embodiments of the present invention.

TABLE 1

| Syntax | Size (bit) | Note |
|---|---|---|
| SBC-REQ Message format( ){ | — | — |
| ~ | ~ | ~ |
| Fast Retransmission Support Extension | 1 | 0: BS does not retransmit the complete message or message fragment of failed HARQ burst1: BS retransmits the complete message or message fragment of failed HARQ burst This field indicates a time duration of listening |

TABLE 1-continued

| Syntax | Size (bit) | Note |
|---|---|---|
| Time Duration | | window extension for retransmission of failed HARQ burst.For instance, this field indicates frame length (e.g., 1 frame, 2 frames, 3 frames, etc) of extendable listening window. |
| $N_{extension}$ | | This field indicates the frame of extension of listening window if AMS or ABS has NACK for HARQ retransmission in DL/UL transmission. |
| ~ | ~ | ~ |
| } // End of SBC-REQ | | |

Table 2 shows an example of the REGistration REQuest (REG-REQ) message format available in the embodiments of the present invention.

TABLE 2

| Syntax | Size (bit) | Note |
|---|---|---|
| REG-REQ Message format( ){ | — | — |
| ~ | ~ | ~ |
| Fast Retransmission Support Extension Time Duration | 1 | 0: BS does not retransmit the complete message or message fragment of failed HARQ burst1: BS retransmits the complete message or message fragment of failed HARQ burst This field indicates a time duration of listening window extension for retransmission of failed HARQ burst.For instance, this field indicates frame length (e.g., 1 frame, 2 frames, 3 frames, etc) of extendable listening window. |
| $N_{extension}$ | | This field indicates the frame of extension of listening window if AMS or ABS has NACK for HARQ retransmission in DL/UL transmission. |
| ~ | ~ | ~ |
| } // End of REG-REQ | | |

Referring to Tables 1 and 2, the SBC-REQ message and the REG-REQ message may include at least one of a fast retransmission support field indicating whether or not a failed HARQ burst is retransmitted by extending the listening window by a predetermined length when the HARQ burst transmission has failed, an extension time duration field indicating a time duration of listening window extension for retransmission of the failed HARQ burst, and an Nextension field (e.g. a timer) indicating an operation time for the HARQ operation when HARQ is applied.

At this time, if the fast retransmission support field is set to "0", this indicates that the ABS does not transmit the failed HARQ burst or the complete message and, if the fast retransmission support field is set to "1", this indicates that the ABS transmits the failed HARQ burst or the complete message using a predetermined extended listening window. The AMS may transmit the fast retransmission support field to the ABS so as to negotiate whether or not the ABS supports fast retransmission.

If the ABS supports fast retransmission, the ABS may enable and transmit the fast retransmission support field to the AMS. At this time, the ABS may transmit the fast retransmission support field to the AMS using a Subscriber station Basic Capability negotiation ReSPonse (MOB_SBC-RSP) message or a REGistration ReSPonse (REG-RSP) message in response to the MOB_SBC-REQ message or the registration request message (S330).

In step S330, the basic capability negotiation response message or the registration response message may further selectively include an extension time duration field indicating the time duration of the listening window extension for retransmission of a failed HARQ burst and an Nextension field indicating the length of the frame of extension of the listening window if an NACK message is transmitted. In this case, the listening window may be explicitly extended by a length indicated by the ABS.

Table 3 shows an example of the Subscriber station Basic Capability negotiation ReSPonse (MOB_SBC-RSP) message format available in the embodiments of the present invention.

TABLE 3

| Syntax | Size (bit) | Note |
| --- | --- | --- |
| SBC-RSP Message format( ){ | — | — |
| ~ | ~ | ~ |
| Fast Retransmission Support | 1 | 0: BS does not retransmit the complete message or message fragment of failed HARQ burst1: BS retransmits the complete message or message fragment of failed HARQ burst |
| Extension Time Duration | | This field indicates a time duration of listening window extension for retransmission of failed HARQ burst. |
| $N_{extension}$ | | This field indicates the frame of extension of listening window if AMS or ABS has NACK for HARQ retransmission in DL/UL transmission. |
| ~ | ~ | ~ |
| } // End of SBC-RSP | | |

Table 4 shows an example of the REGistration ReSPonse (REG-RSP) message format available in the embodiments of the present invention.

TABLE 4

| Syntax | Size (bit) | Note |
| --- | --- | --- |
| REG-RSP Message format( ){ | — | — |
| ~ | ~ | ~ |
| Fast Retransmission Support | 1 | 0: BS does not retransmit the complete message or message fragment of failed HARQ burst1: BS retransmits the complete message or message fragment of failed HARQ burst |
| Extension Time Duration | | This field indicates a time duration of listening window extension for retransmission of failed HARQ burst.For instance, this field indicates frame length (e.g., 1 frame, 2 frames, 3 frames, etc) of extendable listening window. |

TABLE 4-continued

| Syntax | Size (bit) | Note |
| --- | --- | --- |
| $N_{extension}$ | | This field indicates the frame of extension of listening window if AMS or ABS has NACK for HARQ retransmission in DL/UL transmission. |
| ~ | ~ | ~ |
| } // End of REG-RSP | | |

Referring to Tables 3 and 4, the SBC-RSP message and the REG-RSP message may include at least one of a fast retransmission support field indicating whether or not the fast retransmission scheme is applied to a failed HARQ burst when the HARQ burst transmission has failed, an extension time duration field indicating a time duration (frame or subframe unit) of listening window extension for retransmission of the failed HARQ burst, and an Nextension field indicating a time for the HARQ operation when HARQ is applied.

At this time, if the fast retransmission support field is set to "0", this indicates that the ABS does not transmit the failed HARQ burst or the complete message and, if the fast retransmission support field is set to "1", this indicates that the ABS transmits the failed HARQ burst or the complete message using a predetermined extended listening window. In addition, the extension time duration field may be set to a length of 1 to 3 frames (or subframes).

Thereafter, the ABS and the AMS may perform a sleep mode operation, that is, a PSC mode operation (S350).

Figure 4:
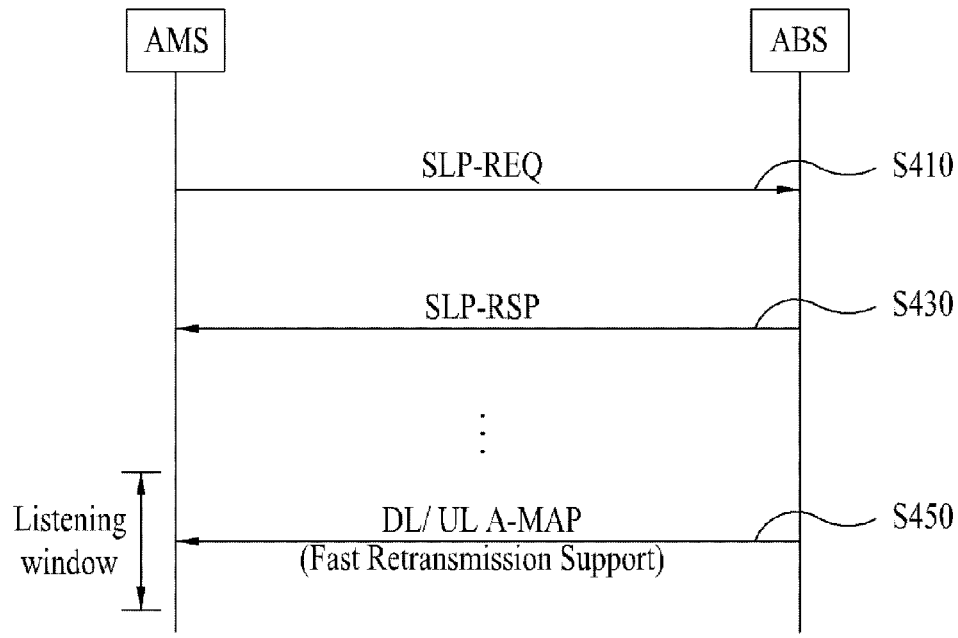
FIG. 4 is a diagram showing another method of negotiating whether or not a fast retransmission scheme is applied according to an embodiment of the present invention.

FIG. 4 is a diagram showing another method of determining whether or not a fast retransmission scheme is applied according to an embodiment of the present invention.

Referring to FIG. 4, an ABS may transmit a fast retransmission support field to an AMS through a map message after activating a sleep mode. In FIG. 4, the AMS may transmit a SLeep REQuest (SLP-REQ) message to the ABS (S410) and the ABS may transmit a SLeep ReSPonse (SLP-RSP) message to the AMS (S430) such that the AMS and the ABS operate in the sleep mode.

In FIG. 4, the AMS and the ABS may transmit or receive timer information using the sleep request and sleep response messages. At this time, the timer information may include information associated with an inactivity timer called a T_AMS timer during a listening interval, information associated with a T_ABS timer maintained in the ABS as a timer similar to the T_AMS timer and a T_HARQ_Retx timer used during HARQ retransmission, or the like. At this time, it is preferable that the T_AMS timer and the T_ABS timer have the same value.

In FIG. 4, the sleep mode is operated in a sleep cycle. The ABS may transmit an Advanced MAP (A-MAP) including a fast retransmission field in a listening interval for performing a normal operation to the AMS. At this time, the A-MAP may be a downlink A-MAP and/or an uplink A-MAP (S450).

Table 5 shows an example of the A-MAP format available in the embodiments of the present invention.

TABLE 5

| Syntax | Size (bit) | Notes |
| --- | --- | --- |
| MSC | 4 or 5 | The exact size depends on link adaptation section. |
| ACID | 4 | HARQ channel identifier used to identify HARQ channels. |
| AI_SN | 1 | HARQ identifier sequence numberThis is toggled between 0 and 1 upon successfully transmitting each encoder packet with the same ARQ channel |
| CoRe Version (CRV) | 2 | The information of CoRe version |

TABLE 5-continued

| Syntax | Size (bit) | Notes |
|---|---|---|
| SPID | 2 | Subpacket identifierFor the FEC mode supporting incremental redundancy |
| Fast Retransmission Support | 1 | 0: BS does not retransmit the complete message or message fragment of failed HARQ burst1: BS retransmits the complete message or message fragment of failed HARQ burst |
| Resource Assignment Information | TBD | |
| TPC Information for UL_CTRL | TBD | Power control command for UL control channel |
| Boosting | 3 | Power boost applied to the allocation s data subcarriers |
| SU/MU MIMO mode indicator | 1 | |
| Rate Indicator | 1~3(4) | Number of TX antennas shall be indicated by superframe header.If 2TX, then 1 bitIf 4TX, then 2 bitsIf 8TX, then 3 bitsIf SU/MU MIMO mode indicator is 1, then this value is the number of multiplexed AMS. |
| Stream Index for MU MIMO user | 1~2 | If 2Tx, then 1 bitElse 2 bits.This is only valid for SU/MU MIMO mode indicator is set to 1.If this value is K, then the AMS s data is allocated to Kth stream. |

Referring to Table 5, the A-MAP may include a Modulation and Coding Scheme (MCS) field having a size depending on a link adaptation section, an ACID field used to identify HARQ channels, an ARQ Identifier Sequence Number (AI_SN) field indicating a HARQ identifier sequence number, a CRV field indicating CoRe version information, a subpacket identifier (SPID) field, a fast retransmission support field indicating whether or not a failed HARQ burst is retransmitted, a resource assignment information field, a TPC information for UL_CTRL field indicating a power control command for an uplink control channel, a boosting field indicating power boost applied to the allocated data subcarriers, an SU/MU MIMO mode indicator field, a rate indicator field indicating the number of transmission antennas indicated by a superframe header, and a stream index for MU MIMO user field. The detailed operations of the fields may refer to the note of Table 5.

In addition, the A-MAP may further include an extension time duration field indicating the time duration of the listening interval extension for retransmission of the failed HARQ burst and an Nextension field (e.g., a timer) indicating the time for the HARQ operation when the HARQ is applied.

Referring to FIG. 4 again, if the ABS does not negotiate whether or not the fast retransmission is supported in the basic capability negotiation process or the registration process, as shown in FIG. 4, the ABS may notify the AMS of whether or not the fast retransmission support of the HARQ burst is provided when the HARQ burst transmission has failed using the A-MAP message.

Figure 5:
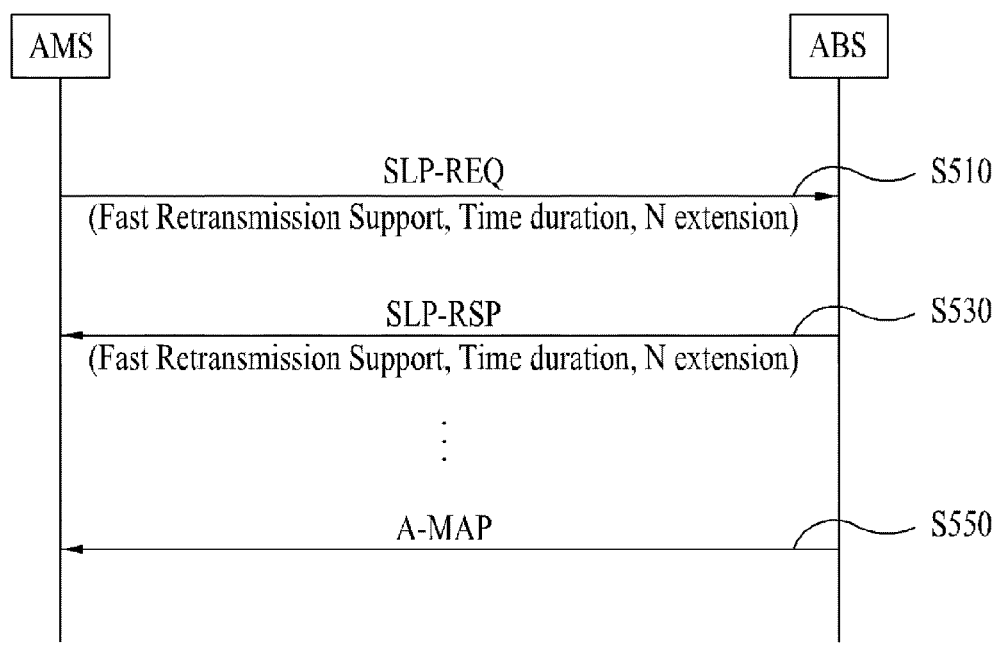
FIG. 5 is a diagram showing another method of negotiating whether or not a fast retransmission scheme is applied according to an embodiment of the present invention.

FIG. 5 is a diagram showing another method of negotiating whether or not a fast retransmission scheme is applied according to an embodiment of the present invention.

FIG. 5 shows a process of negotiating whether the fast retransmission scheme is supported using a sleep request/response message while an AMS activates a sleep mode. Referring to FIG. 5, the AMS may transmit a SLeep REQuest (SLP-REQ) message to an ABS so as to request the activation of the sleep mode and negotiate whether or not the fast retransmission scheme is supported using the sleep request message (S510).

Table 6 shows an example of a SLeep REQuest (SLP-REQ) message format available in the embodiments of the present invention.

TABLE 6

| Syntax | Size (bit) | |
|---|---|---|
| SLP-REQ Message format( ){ | — | |
| ~ | ~ | ~ |
| Fast Retransmission Support | 1 | 0: BS does not retransmit the complete message or message fragment of failed HARQ burst1: BS retransmits the complete message or message fragment of failed HARQ burst |
| Extension Time Duration | | This field indicates a time duration of listening window extension for retransmission of failed HARQ burst.For instance, this field indicates frame length (e.g., 1 frame, 2 frames, 3 frames, etc.) of extendable listening window. |
| $N_{extension}$ | | This field indicates the frame of extension of listening window if AMS or ABS has NACK for HARQ retransmission in DL/UL transmission. |
| ~ | ~ | ~ |
| } // End of SLP-REQ | | |

Referring to Table 6, the SLP-REQ message may include at least one of a fast retransmission support field indicating whether or not the fast retransmission scheme is applied to the failed HARQ burst when the HARQ burst transmission has failed, an extension time duration field indicating a time duration of listening window extension for retransmission of the failed HARQ burst, and an Nextension field indicating a time for the HARQ operation when HARQ is applied.

At this time, if the fast retransmission support field is set to "0", this indicates that the ABS does not transmit the failed HARQ burst or the complete message and, if the fast retransmission support field is set to "1", this indicates that the ABS transmits the failed HARQ burst or the complete message using a predetermined extended listening window. The AMS may transmit the fast retransmission support field to the ABS so as to negotiate whether or not the ABS supports fast retransmission.

The ABS may transmit a sleep response message to the AMS in response to the sleep request message (S530).

Table 7 shows an example of the SLeep ReSPonse (SLP-RSP) message format available in the embodiments of the present invention.

TABLE 7

| Syntax | Size (bit) | Note |
|---|---|---|
| SLP-RSP Message format( ){ | — | — |
| ~ | ~ | ~ |
| Fast Retransmission Support | 1 | 0: BS does not retransmit the complete message or message fragment of failed HARQ burst1: BS retransmits the complete message or message fragment of failed HARQ burst |
| Extension Time Duration | | This field indicates a time duration of listening window extension for retransmission of failed HARQ burst. For instance, this field indicates frame length (e.g., 1 frame, 2 frames, 3 frames etc.) of extendable listening window. |
| $N_{extension}$ | | This field indicates the frame of extension of listening window if AMS or ABS has NACK for HARQ retransmission in DL/UL transmission |
| ~ | | ~ |
| }//End of SLP-RSP | | |

Referring to Table 7, when the ABS supports the fast retransmission scheme, the fast retransmission support field may be set to "1" and transmitted to the AMS. If the ABS does not support the fast retransmission scheme, the fast retransmission support field may be set to "0" and transmitted to the AMS.

In addition, the ABS may explicitly notify the AMS of the extension time duration for applying the fast retransmission scheme using the extension time duration field, in the case where the ABS supports the fast retransmission scheme. At this time, the extension time duration may be one of 1 frame, 2 frames and 3 frames (or subframes). In addition, the ABS may further include the Nextension field for transmitting a HARQ NACK in the SLP-RSP message, and transmit the SLP-RSP message to the AMS.

The ABS may periodically or non-periodically transmit control information to the AMS using an A-MAP message (S550).

Figure 6:
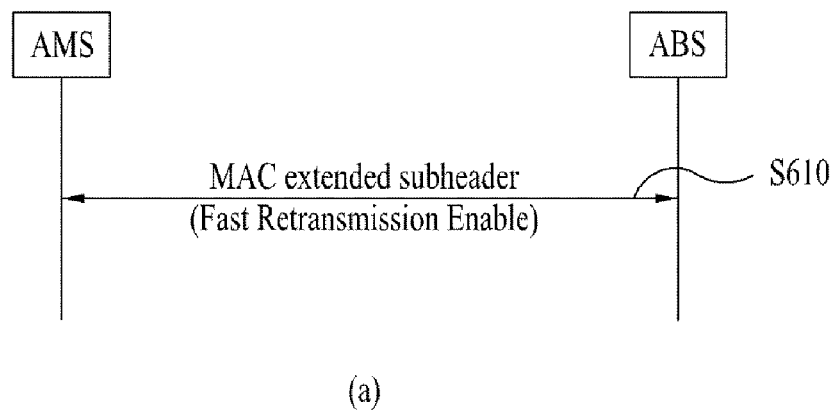
FIG. 6 is a diagram showing another method of negotiating whether or not a fast retransmission scheme is applied according to an embodiment of the present invention.
Figure 6:
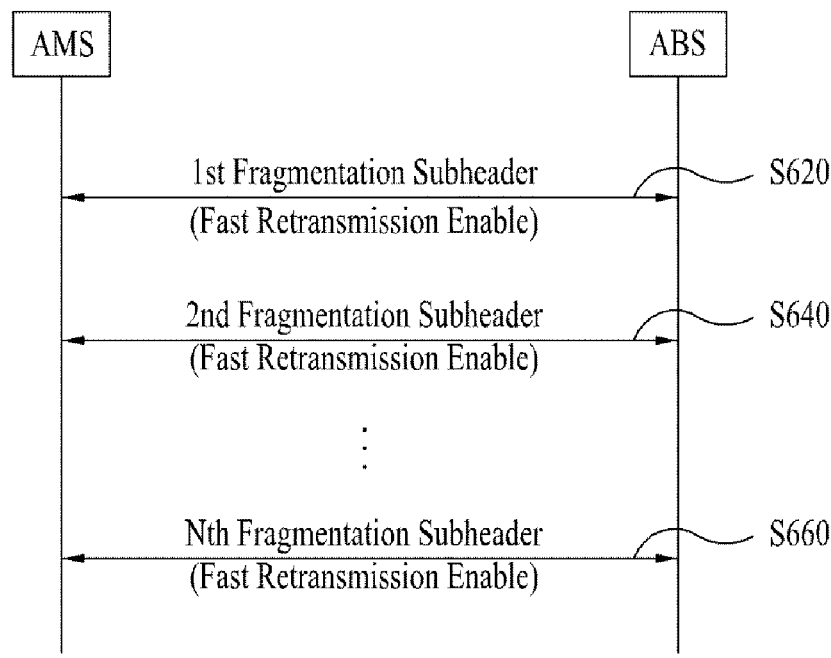

FIG. 6 is a diagram showing another method of negotiating whether or not a fast retransmission scheme is applied according to an embodiment of the present invention.

FIG. 6(a) shows a method of, at an ABS, transmitting a downlink (DL) MAC management message using an Extended Sub-Header (ESH). That is, in FIG. 6(a), an ESH of a DL MAC management message is newly defined for enabling an AMS to reliably receive the MAC management message.

Referring to FIG. 6(a), the ABS may add a fast retransmission support (fast retransmission enable) field to the ESH of the DL MAC message transferred within a listening window of the AMS and transmit the ESH to the AMS (S610).

At this time, the downlink message may be a MAC PDU or a MAC management message which is general data. Table 8 shows an example of the ESH applied to the embodiments of the present invention.

TABLE 8

| Name | Size (bit) | Description |
|---|---|---|
| Fast Retransmission Support | 1 | 0: BS does not retransmit the complete message or message fragment of failed HARQ burst1: BS retransmits the complete message or message fragment of failed HARQ burst |

If the fast retransmission support field included in the ESH of the MAC management message is set to "1" and the AMS does not successfully receive the message until a NACK message is transferred four times in response to the DL MAC management message, the AMS may continuously extend the current listening window in order to receive the MAC management message to be fast retransmitted by the ABS. If the fast retransmission support field is set to "0", the AMS transmits the NACK message four times and then activates the sleep mode without extending the listening window so as to prevent power consumption.

FIG. 6(b) shows a method of notifying an AMS of whether a fast retransmission method is supported in the case where an ABS fragments a DL MAC management message into several bursts and transmits the bursts.

In the case where the DL MAC management message is fragmented into a predetermined number (N) of bursts and is transmitted to the AMS, fragmentation subheaders may be attached to the fragmentation MAC management message bursts as one of MAC ESH and the bursts are transmitted (S620, S640 and S660).

Table 9 shows an example of the fragmentation subheader as one of MAC ESH.

TABLE 9

| Syntax | Size (bit) | Notes |
|---|---|---|
| Fragmentation subheader_Format( ){ | — | — |
| ~ | | |
| Fast Retransmission Support | | 0: BS does not retransmit the complete message or message fragment of failed HARQ burst1: BS retransmits the complete message or message fragment of failed HARQ burst |
| ~ | | |
| }// End of Fragmentation subheader | | |

Referring to Table 9, in the case where a fast retransmission field included in the fragmentation subheader is transmitted in a state of being set to "1", the AMS may extend a listening window until all the fragmentation MAC management message bursts are received. In the case where the fast retransmission field included in the fragmentation subheader is transmitted in a state of being set to "0", the AMS may activate a sleep mode without extending the listening window when the maximum number of times of retransmission of HARQ bursts of the MAC management message has expired, thereby preventing power consumption.

The header extended when transmitting the DL MAC management message was described with reference to FIG. 6. However, the AMS and the ABS may transmit or receive the MAC management message using the same ESH and the fragmentation subheader even in uplink transmission, similar to downlink transmission.

As one method of providing the fast retransmission scheme, system parameters which are previously set by the AMS and the ABS may be used. That is, the AMS and the ABS may possess the system parameters for predetermined time parameters in advance, when the system is established or a service is formed.

Table 10 shows an example of the system parameters possessed by the AMS and the ABS.

TABLE 10

| System | Name | Time Reference | Minimum Value | Default Value | Maximum Value |
|---|---|---|---|---|---|
| AMS, ABS | Time Duration of listening window extension for retransmission of failed HARQ burst | Time for extending the listening window of the sleep cycle for HARQ sleep burst if HARQ failure occurs during MAC management message transmission | 1 frame (This value is only exemplary and may be set to another value) | 2 frames (This value is only exemplary and may be set to another value) | 5 frames (This value is only exemplary and may be set to another value) |
| | $N_{extension}$ | This field indicates the frame of extension of listening window if AMS or ABS has NACK for HARQ re-transmission in DL/UL transmission | 1 frame (This is only exemplary and may be set to another value) | 2 frames (This value is only exemplary and may be set to another value) | 5 frames (This value is only exemplary and may be set to another value) |

Referring to Table 10, the extension time duration field indicates a time for extending the listening window of the sleep cycle for the retransmission of the failed HARQ burst if HARQ failure occurs during MAC management message transmission. The extension time duration field may be basically set to two frames and may be set in a range of 1 frame to 5 frames.

In addition, the Nextension field indicates the length of the frame of extension of listening window if AMS or ABS has received a NACK message during HARQ retransmission. The Nextension field may be basically set to two frames and may be set in a range of 1 frame to 5 frames.

Although the fields are shown in the frame units in Table 10, the fields may be configured in the subframe units according to user requirements or system environments.

Hereinafter, methods of, at an AMS and an ABS, transmitting a MAC management message or a MAC PDU using a fast retransmission scheme in a sleep mode will be described in detail.

<Sleep Mode Operating Method>

The following embodiments relate to sleep mode operating methods after negotiating whether or not the fast retransmission scheme is applied as shown in FIGS. 3 to 6. That is, in the case where the fast retransmission support field is set to "1", the methods of, at the AMS and the ABS, transmitting or receiving the MAC management message and/or the MAC PDU will be described.

Figure 7:
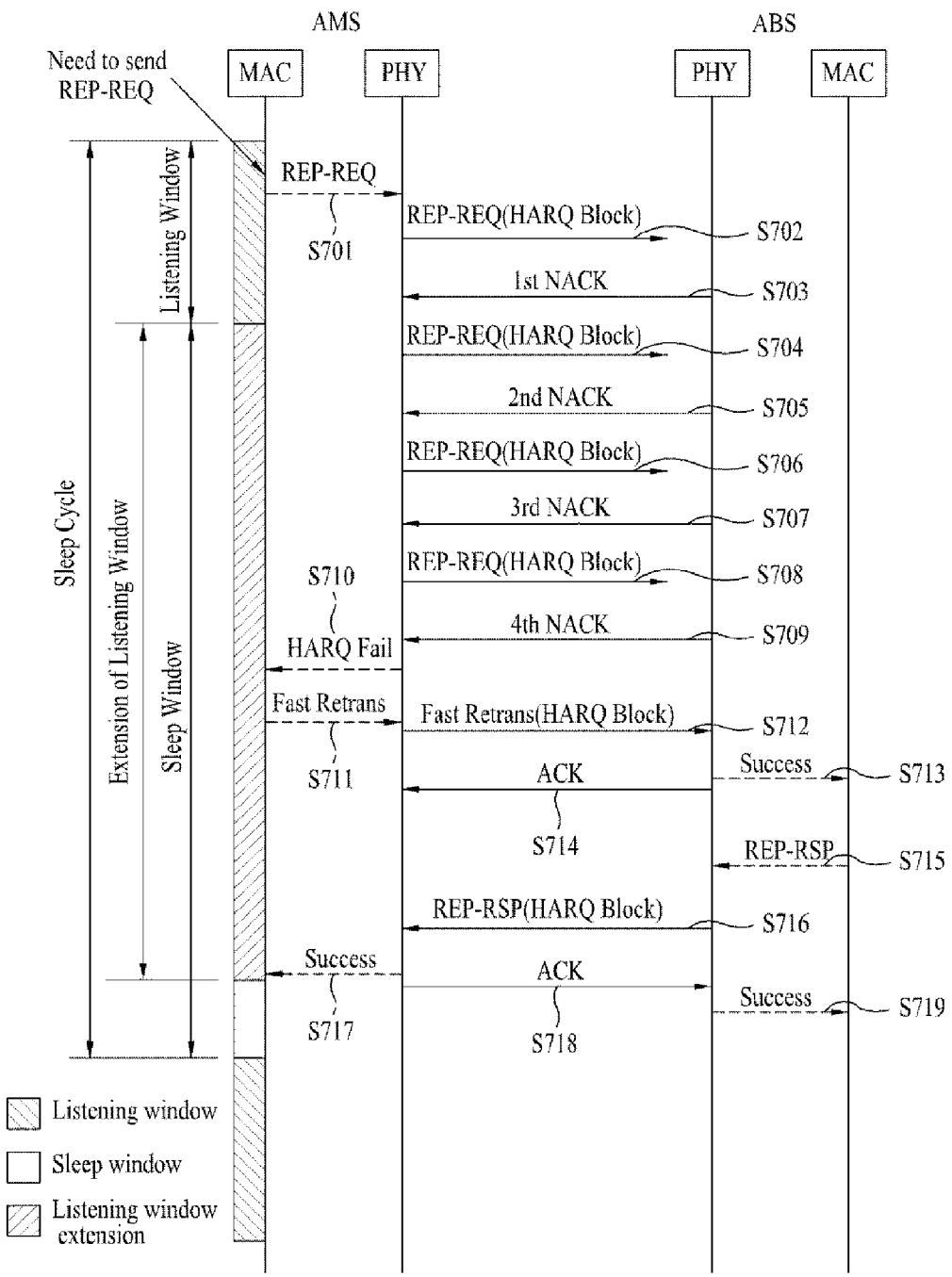
FIG. 7 is a diagram showing one sleep mode operation, to which a fast retransmission scheme is applied, according to another embodiment of the present invention.

FIG. 7 is a diagram showing one sleep mode operation, to which a fast retransmission scheme is applied, according to another embodiment of the present invention.

FIG. 7 shows a method of transmitting failed HARQ burst using the fast retransmission scheme if an AMS transmits or receives a MAC management message using a HARQ scheme and the HARQ process for the MAC management message is not successfully finished. For example, the AMS and an ABS may extend a listening window of a message fragment or a complete message of the failed HARQ burst so as to rapidly perform fast retransmission.

In FIG. 7, the AMS may need to transmit a report request (REP-REQ) message which is one of MAC management messages in uplink. The REP-REQ/RSP message is an example of the MAC management message and other MAC management messages may be transmitted using the method described with respect to FIG. 7. In this case, the report request (REP-REQ) message is transferred from a MAC layer to a physical (PHY) layer of the AMS (S701).

In the PHY layer, the MAC management message and/or data may be fragmented into blocks which are predetermined transfer units so as to be transmitted. Accordingly, in the PHY layer of the AMS, the REP-REQ message may be reconfigured to form HARQ blocks and the HARQ blocks are transmitted to a PHY layer of the ABS. That is, the AMS may transmit the REP-REQ message which is one of MAC management message to the ABS using the HARQ scheme (S702).

In the case where the ABS does not successfully receive the HARQ blocks transmitted by the AMS, the ABS transmits a first NACK signal (or a NACK message) to the AMS (S703).

The AMS which receives the NACK signal may extend the current listening window and retransmit the HARQ blocks to the ABS in order to transmit the failed HARQ blocks (S704).

In the HARQ process, the maximum number of transmission of the NACK signal may be determined according to system environments. In the embodiments of the present invention, it is assumed that the NACK signal is transmitted a maximum of four times. That is, if the NACK signal is transmitted four times, the AMS or the ABS may recognize that the HARQ block transmission has failed.

Accordingly, if the HARQ block transmission of the AMS has failed the maximum number of times of retransmission, that is, four times, as shown in FIG. 7, the HARQ process is finished. In the embodiments of the present invention, the maximum number of times of retransmission, that is, four times, includes the case where transmission failures continuously occur and the case where transmission failures discontinuously occur (S704 to S709).

At this time, in steps S703, S705, S707 and S709, whenever the ABS transmits the NACK message, the ABS may extend the listening window for HARQ NACK transmission by the Nextension field described with reference to Tables 1 to 4, 6, 7 and 10.

That is, the ABS starts a timer set by the Nextension field after transmitting the NACK message. At this time, the ABS retransmits the NACK message if the MAC management message (e.g., REP-REQ) is not received in response to the NACK message until the Nextension period has expired. The ABS may repeat such a process by the maximum number of times of retransmission of the HARQ process. Accordingly, the AMS and the ABS may extend the listening window and retransmit the management message even in the sleep window set in the sleep cycle.

The AMS may recognize that the listening window is extended by the Nextension field acquired by the process described with reference to FIGS. 3 to 6, when receiving the NACK signal from the ABS.

If the MAC management message is not received even when the ABS transmits the NACK signal by the maximum number of times of retransmission and the ACK signal is not received even when the AMS transmits the MAC management message by the maximum number of times of retransmission, the ABS and the AMS may recognize that the HARQ process has failed. At this time, in order to apply the fast retransmission scheme described with reference to Tables 1 to 4, 6, 7, and 10, the ABS may extend the listening window by the extension time duration field and retransmit the failed HARQ burst.

Referring to FIG. 7 again, the PHY layer of the AMS reports the HARQ failure to the MAC layer which is an upper layer (S710).

However, since it is determined that the fast retransmission scheme is supported in the initial network entrance or registration process (that is, the fast retransmission support field is set to "1"), the AMS may further extend the listening window and resume the HARQ process. Accordingly, the AMS may rapidly retransmit the message fragment or the complete message of the failed HARQ burst.

That is, the MAC layer of the AMS may instruct the fast retransmission of the HARQ burst (S711) and the PHY layer of the AMS may transmit the failed HARQ block to the PHY layer of the ABS (S712).

If the HARQ burst of the REP-REQ message is successfully received, the PHY layer of the ABS notifies the MAC layer of the ABS of the successful reception of the HARQ burst (S713).

In addition, the PHY layer of the ABS transmits the ACK signal indicating successful reception to the PHY layer of the AMS (S714) and the MAC layer of the ABS instructs the PHY layer to transmit a REP-RSP message in response to the REP-REQ message (S715).

The PHY layer of the ABS may transmit the HARQ blocks of the REP-RSP message using the HARQ transmission scheme. Even in the ABS, if the HARQ block transmission has failed, the listening window of the sleep cycle may be extended and the failed HARQ block may be retransmitted (S716), similar to the AMS.

If the HARQ block of the REP-RSP message is successfully received, the PHY layer of the AMS notifies the MAC layer of the successful reception of the REP-RSP message (S717) and may transmit an ACK signal to the ABS. At this time, the AMS which receives the REP-RSP message may rapidly transition to the sleep mode if the extended listening window is finished (S718).

The PHY layer of the ABS which receives the ACK signal may notify the MAC layer of the ABS of the successful transmission of the REP-RSP message (S719).

Figure 8:
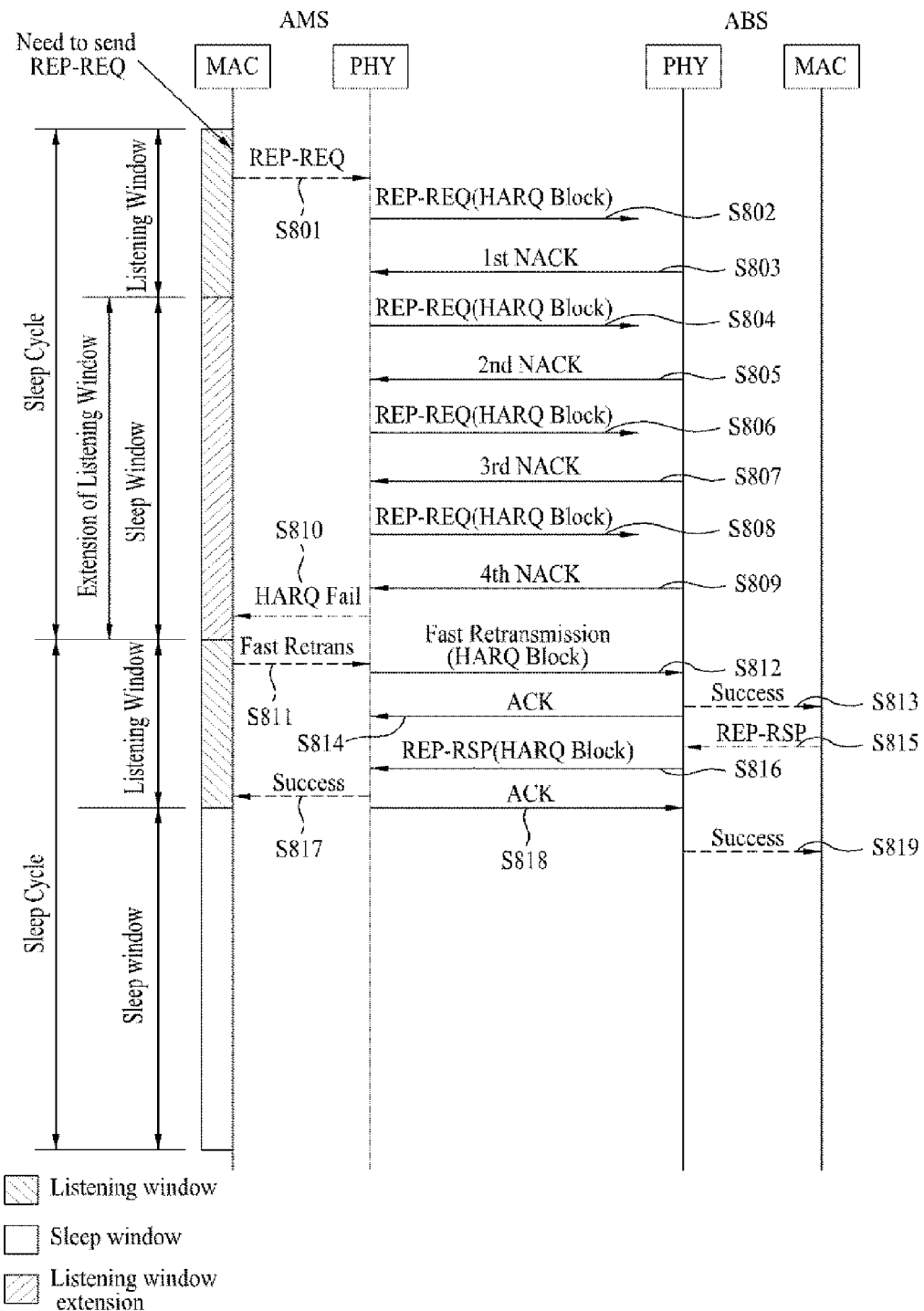
FIG. 8 is a diagram showing another sleep mode operation, to which a fast retransmission scheme is applied, according to another embodiment of the present invention.

FIG. 8 is a diagram showing another sleep mode operation, to which a fast retransmission scheme is applied, according to another embodiment of the present invention.

FIG. 8 shows another embodiment of FIG. 7 and shows a sleep mode operation method in the case where an AMS does not complete transmission or reception of a MAC management message during a current sleep cycle. The basic assumption of the operation of FIG. 8 is equal to that of FIG. 7. That is, steps S801 to S809 are equal to steps S701 to S709 of FIG. 7.

In FIG. 8, since the AMS uses the entire sleep window of the current sleep cycle as extension of a listening window, fast retransmission of the failed HARQ burst may be performed in the listening window of the next sleep cycle.

Referring to FIG. 8, the PHY layer of the AMS reports the HARQ failure to the MAC layer which is an upper layer (S810).

At this time, since it is determined that the fast retransmission scheme is supported in the initial network entrance or the registration process (that is, the fast retransmission support field is set to "1"), the AMS may further extend the listening window and resume the HARQ process. However, since the entire sleep window of the current sleep cycle is previously extended, the MAC layer of the AMS may instruct fast retransmission of the HARQ burst in the next listening window (S811).

The PHY layer of the AMS may retransmit the failed HARQ block to the PHY layer of the ABS in the listening window of the next sleep cycle (S812).

Hereinafter, steps S813 to S189 are equal to steps S713 to S719 and thus will be replaced with the description of FIG. 7.

Figure 9:
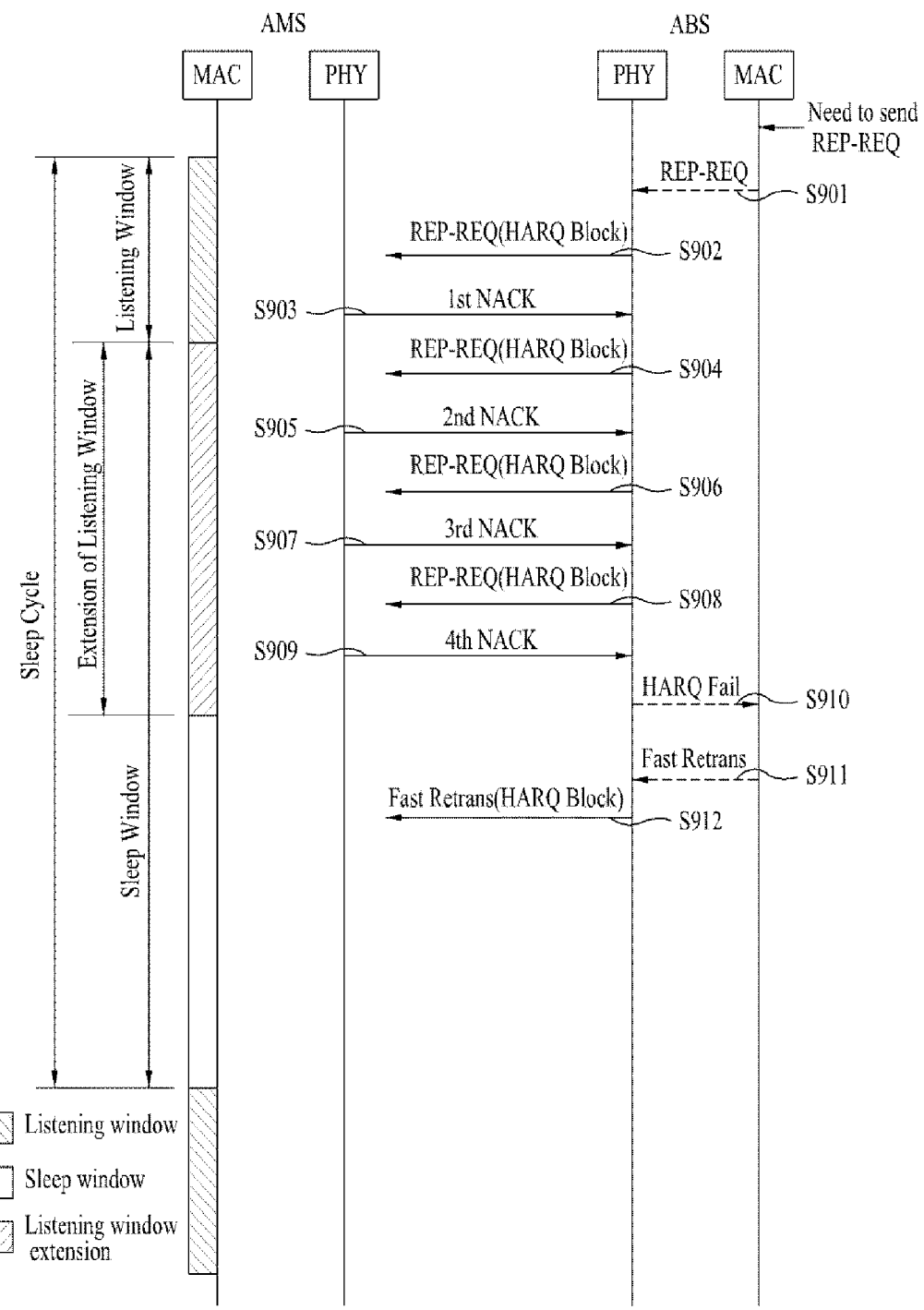
FIG. 9 is a diagram showing a procedure of, at an advanced base station, transmitting a Media Access Control (MAC) management message in downlink in a sleep mode operation.

FIG. 9 is a diagram showing a procedure of, at an ABS, transmitting a MAC management message in downlink in a sleep mode operation.

FIG. 9 shows the case where a HARQ process of the MAC management message is not successfully finished when the ABS transmits or receives the MAC management message using the HARQ process.

Referring to FIG. 9, the ABS may need to transmit a report request (REP-REQ) message which is one of MAC management message in downlink. In this case, a MAC layer of the ABS transmits a report request (REP-REQ) block to a PHY layer (S901).

The MAC management message and/or data may be fragmented into blocks which are predetermined transfer units so as to be transmitted. Accordingly, in the PHY layer of the ABS, the REP-REQ message may be reconfigured so as to form HARQ blocks and the HARQ blocks may be transmitted to a PHY layer of the AMS. That is, the ABS may transmit the REP-REQ message which is one of MAC management messages to the AMS using the HARQ scheme (S902).

In the case where the AMS does not successfully receive the HARQ blocks transmitted by the ABS, the AMS transmits a first NACK signal (or a message) to the ABS (S903).

The ABS which receives the NACK signal may extend the current listening window and retransmit the HARQ blocks to the AMS in order to transmit the failed HARQ blocks (S904).

In the HARQ process, the maximum number of transmissions of the NACK signal may be determined according to system environments. In the embodiments of the present invention, it is assumed that the NACK signal is transmitted a maximum of four times. That is, if the NACK signal is transmitted four times, the AMS or the ABS may recognize that the HARQ block transmission has failed.

Accordingly, if the HARQ block transmission of the ABS has failed the maximum number of times of retransmission, that is, four times, as shown in FIG. 9, the HARQ process is finished and the AMS immediately activates the sleep mode without extending the listening window (S904 to S909).

The PHY layer of the ABS reports the HARQ failure to the MAC layer which is an upper layer (S910).

The MAC layer of the ABS may instruct the PHY layer to retransmit the failed MAC management message (S911) and the PHY layer may reconfigure the REP-REQ message so as to form HARQ blocks and may transmit the HARQ blocks to the AMS (S912).

At this time, since the AMS does not receive the message transmitted by the ABS, it is not determined whether the message transmitted by the ABS is data traffic or the MAC management message. Accordingly, since the AMS transitions to the sleep mode at the instant that the HARQ process is finished, the AMS may not receive the message retransmitted by the ABS.

Figure 10:
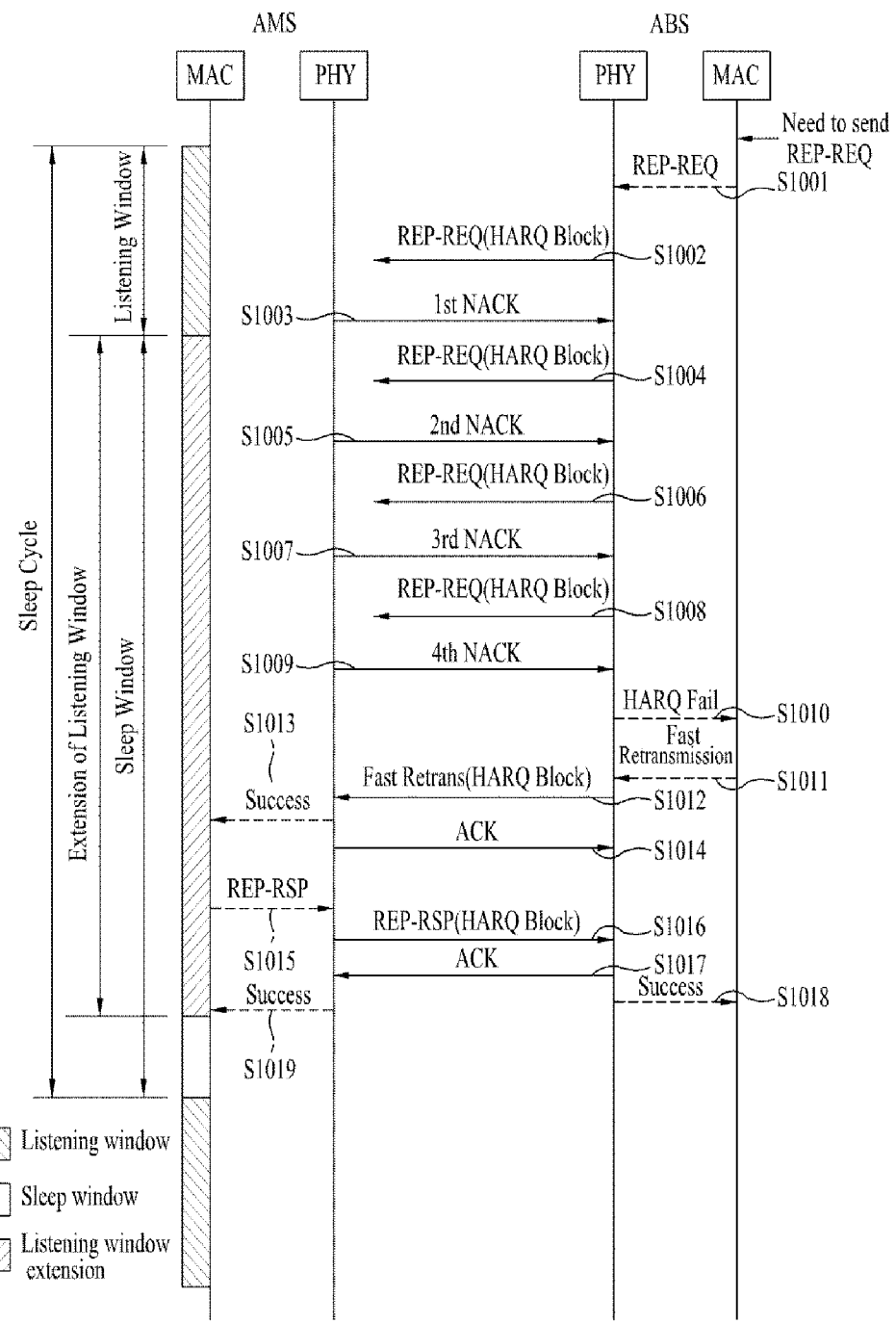
FIG. 10 is a diagram showing another sleep mode operation, to which a fast retransmission scheme is applied, according to another embodiment of the present invention.

FIG. 10 is a diagram showing another sleep mode operation, to which a fast retransmission scheme is applied, according to another embodiment of the present invention.

The embodiment of FIG. 10 relates to a sleep mode operation method after negotiating whether or not the fast retransmission scheme is supported as shown in FIGS. 3 to 6. That is, the methods of, at an AMS and an ABS, transmitting or receiving a MAC management message and/or a MAC PDU in the case where a fast retransmission support field is set to "1" will be described.

Steps S1001 to S1009 of FIG. 10 are equal to steps S901 to S909 of FIG. 9 and thus will refer to FIG. 9 in order to avoid repeated description.

At this time, an AMS may extend a listening window for HARQ NACK transmission by the Nextension field described with reference to Tables 1 to 4, 6, 7 and 10, whenever the NACK message is transmitted in steps 1003, S1005, S1007 and S1009.

That is, the AMS starts a timer set by the Nextension field after transmitting a NACK message. At this time, the AMS retransmits the NACK message if data traffic or a MAC management message (e.g., a REP-REQ message) is not received in response to the NACK message before the Nextension period expires. The AMS may repeat such a process by the maximum number of times of a HARQ process.

If the MAC management message is not received even when the AMS transmits the NACK signal by the maximum number of times of retransmission, the AMS recognizes that the HARQ process has failed. In addition, the AMS may extend the listening window by the extension time duration field and receive the failed HARQ burst in order to apply the fast retransmission scheme described with reference to Tables 1, 4, 6, 7 and 10.

A PHY layer of the ABS retransmits the REP-REQ message a maximum of four times and then notifies a MAC layer of HARQ retransmission failure (S1010).

The MAC layer of the ABS and the AMS negotiate the application of the fast retransmission scheme in advance, the MAC layer of the ABS may instruct the PHY layer to immediately transmit the REP-REQ message (S1011).

The PHY layer may reconfigure the REP-REQ message so as to form HARQ blocks and immediately transmit the HARQ blocks to the AMS. At this time, since the AMS recognizes that the fast retransmission scheme is applied in advance, the AMS may further extend the listening window without transitioning to the sleep window and receive the REP-REQ message (S1012).

When the HARQ burst of the REP-REQ message is successfully received, a PHY layer of the AMS notifies a MAC layer of the AMS of successful reception of the HARQ burst (S1013).

In addition, the PHY layer of the AMS transmits an ACK signal indicating successful reception to the PHY layer of the ABS (S1014) and the MAC layer of the AMS instructs the PHY layer to transmit a REP-RSP message in response to the REP-REQ message (S1015).

The PHY layer of the AMS may transmit the HARQ blocks of the REP-RSP message using the HARQ transmission scheme. If the HARQ block transmission of the REP-RSP message has failed, the AMS may extend the listening window of the sleep cycle and retransmit the failed HARQ blocks (S1016), similar to the previous step.

When the HARQ blocks of the REP-RSP message are successfully received, the PHY layer of the ABS notifies the MAC layer of successful reception of the REP-RSP message and retransmits an ACK signal to the AMS (S1017 and S1018).

The PHY layer of the AMS which receives the ACK signal may notify the MAC layer of the AMS of successful transmission of the REP-RSP message (S1019).

The AMS may transition to the sleep window if the listening window extension for fast retransmission has expired, thereby reducing power consumption.

Figure 11:
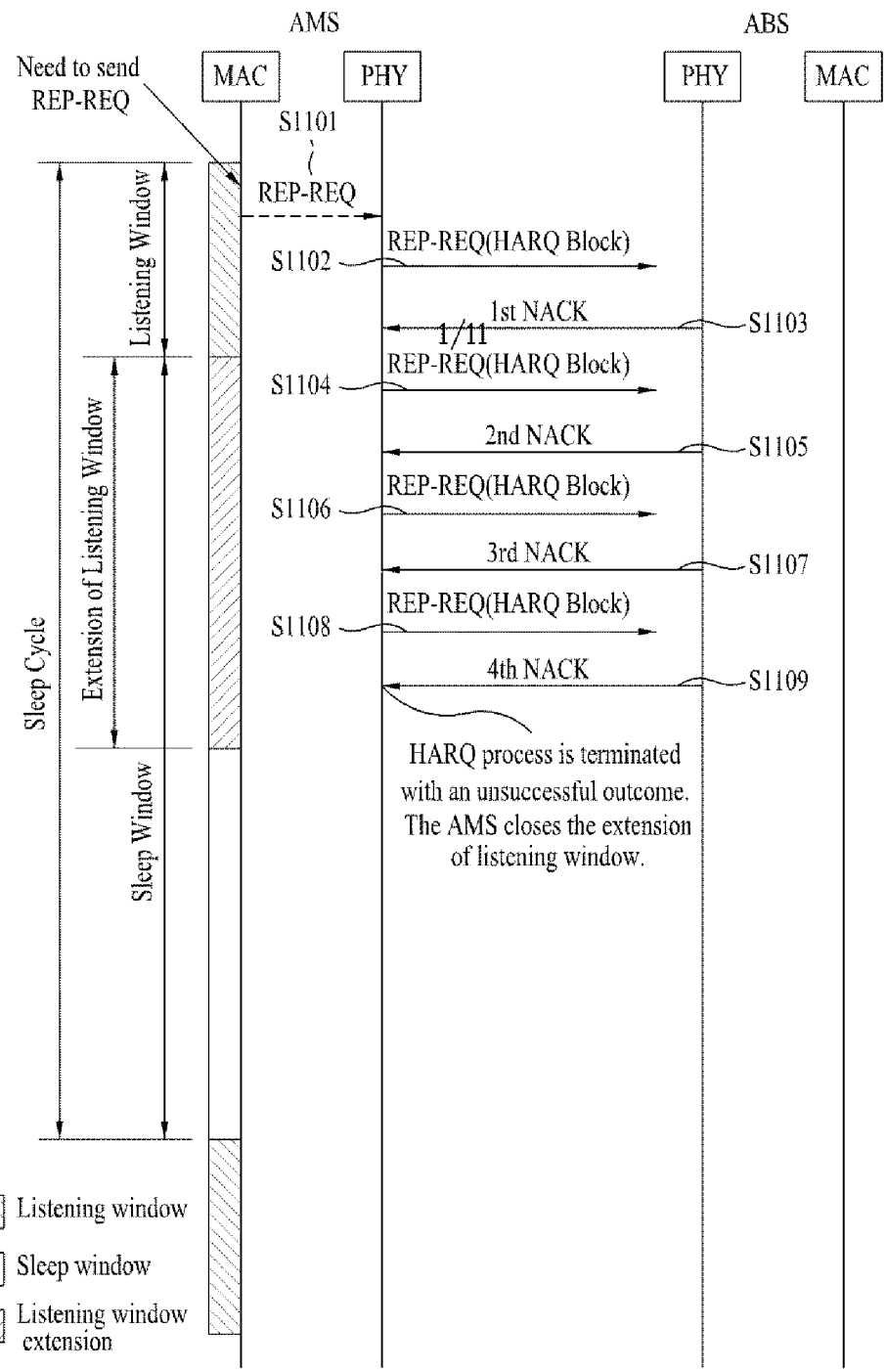
FIG. 11 is a diagram showing a sleep mode operation in the case where a fast retransmission scheme is not applied, according to another embodiment of the present invention.

FIG. 11 is a diagram showing a sleep mode operation in the case where a fast retransmission scheme is not applied, according to another embodiment of the present invention.

FIG. 11 shows sleep mode operation methods after negotiating whether or not a fast retransmission scheme is supported as shown in FIGS. 3 to 6. In FIG. 11, a fast retransmission support field is set to "0" and the fast retransmission scheme is not supported.

Steps S1101 to S1109 of FIG. 11 are similar to steps S701 to S709 of FIG. 7. Accordingly, the description of steps S1101 to S1109 of FIG. 11 will be replaced with the description of steps S701 to S709.

In FIG. 11, an ABS finishes a HARQ process when receiving a NACK signal four times in response to HARQ blocks retransmitted by an AMS. That is, if the fast retransmission support field received through an A-MAP during initial network entrance or a registration process is set to "0", the ABS may maintain a PSC mode during a remaining sleep window without extending a listening window.

Accordingly, in FIG. 11, when the AMS transmits a REP-REQ message which is a MAC management message to the ABS and receives a NACK signal from the ABS, the listening window is extended by the Nextension period. However, after the HARQ retransmission process is finished, the AMS activates the PSC mode, that is, the sleep mode, without retransmitting the MAC management message, thereby reducing power consumption.

Figure 12:
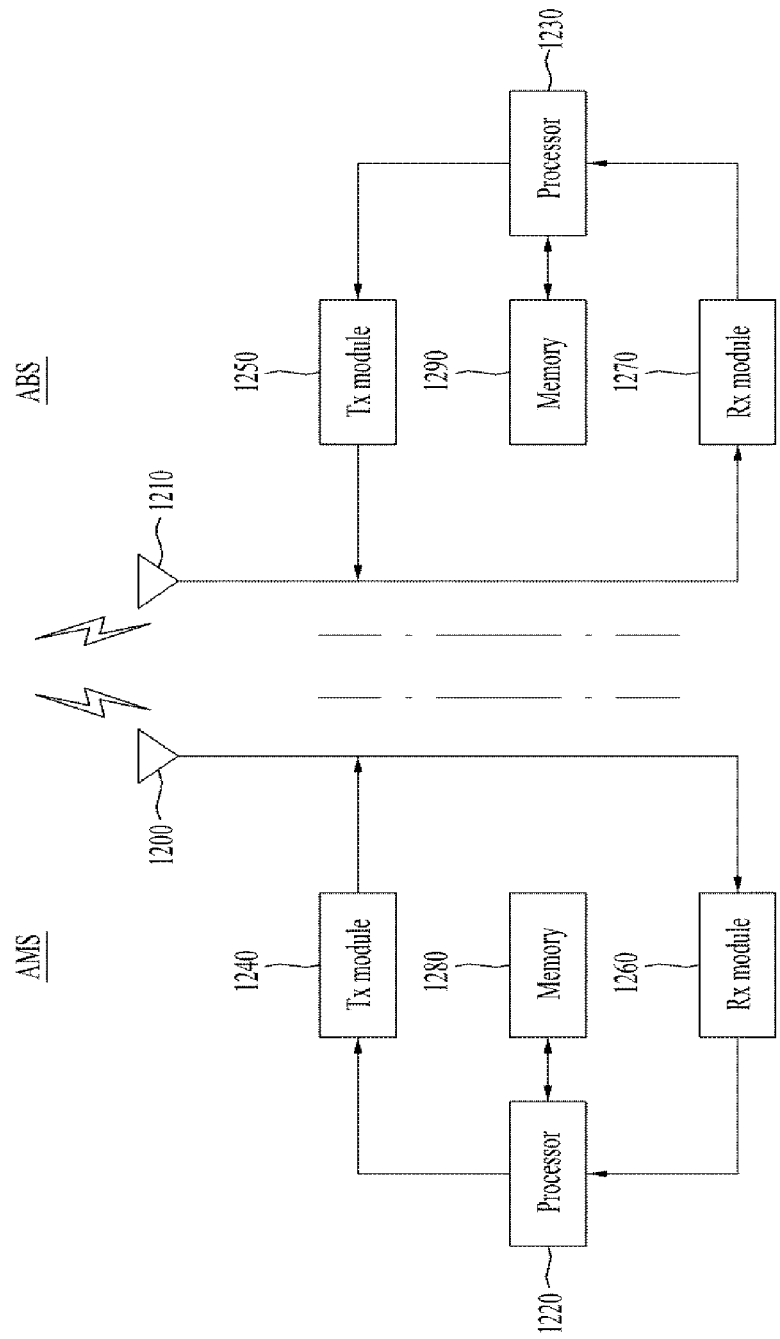
FIG. 12 is a diagram showing the configuration of a mobile station and a base station implemented by the embodiments of the present invention.

FIG. 12 is a diagram showing the configuration of a mobile station and a base station implemented by the embodiments of the present invention described with reference to FIGS. 2 to 11, according to another embodiment of the present invention The AMS and the ABS may include antennas 1200 and 1210 for transmitting or receiving information, data, a signal and/or a message, transmission (Tx) modules 1240 and 1230 for controlling the antennas so as to transmit messages, reception (Rx) modules 1260 and 1250 for controlling the antennas so as to receive messages, memories 1280 and 1270 for storing information associated with communication with the ABS, and processors 1220 and 1210 for controlling the Tx modules, the Rx modules and the memories.

The antennas 1200 and 1210 transmit signals generated by the Tx modules 1240 and 1230 to external devices or receive and send wireless signals from external devices to the reception modules 1260 and 1250. In the case where a multi input multi output (MIMO) function is supported, two or more antennas may be included.

The processors 1220 and 1210 generally control the overall operation of the AMS or the ABS. In particular, the processors may perform a control function for implementing the above-described embodiments of the present invention, a MAC frame variable control function according to service characteristics and propagation environments, a handover function, and an authentication and encryption function.

In addition, the processors 1220 and 1230 of the AMS and the ABS may include HARQ modules and timers used for a HARQ operation, respectively. That is, the AMS and the ABS may perform the methods described with reference to FIGS. 2 to 11 using the processors and the HARQ modules and the timers included in the processors. At this time, the timers may be mounted inside or outside the processors.

The Tx modules 1240 and 1230 perform coding and modulation with respect to signals and/or data scheduled by the processors and transmitted to the external devices and send the signals and/or data to the antennas 1200 and 1210.

The Rx modules 1260 and 1250 perform decoding and demodulation with respect to the wireless signals received from the external devices through the antennas 1200 and 1210 so as to restore the signals to original data, and send the original data to the processors 1220 and 1230.

The memories 1280 and 1270 may store programs for processing and controlling the processors and perform a function for temporarily storing input/output data (in the AMS, uplink grant allocated by the ABS, system information, a system identifier (STID), a flow identifier (FID), an operation time, area allocation information, frame offset information, and the like).

In addition, the memories may include at least one of a flash memory type, hard disk type, multimedia card micro type, or card type memory (e.g., a SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, or an optical disk.

Hereinafter, the functions of the AMS and the ABS will be described in detail.

The AMS and the ABS may perform the operations described with reference to FIGS. 2 to 11 using the above-described functions of the antennas 1200 and 1210, the processors 1220 and 1230, the Tx modules 1240 and 1250, the Rx modules 1260 and 1270 and the memories 1280 and 1290.

The AMS and the ABS may negotiate whether or not a fast retransmission scheme is supported using the methods described with reference to FIGS. 3 to 6.

After negotiating whether or not the fast retransmission scheme is supported, the AMS and the ABS may rapidly transmit or receive the MAC management message based on the HARQ operation when transmitting or receiving the MAC management message in the sleep mode as described with reference to FIGS. 7 to 11. That is, the processor may control the Tx module and the antenna such that the AMS transmits the MAC management message or MAC messages, and the AMS may perform the HARQ operation using the processor and the Tx module. That is, the processor of the AMS may control the HARQ module using the MAC management message, switch to a HARQ block, and perform the HARQ operation.

Meanwhile, in the present invention, a Personal Digital Assistant (PDA), a cellular phone, a Personal Communication Service (PCS) phone, a Global System for Mobile (GSM) phone, a Wideband CDMA (WCDMA) phone, a Mobile Broadband System (MBS) phone, a hand-held PC, a notebook type PC, a smart phone or a Multi Mode-Multi Band (MM-MB) terminal may be used as the AMS.

The embodiments of the present invention may be implemented by various parts. For example, the embodiments of the present invention may be implemented by hardware, firmware, software or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. For example, the software code may be stored in the memories 1280 and 1290 so that it can be driven by the processors 1220 and 1230. The memory units are located inside or outside of the processors, so that they can communicate with the aforementioned processors via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Mode for the Invention

Various embodiments have been described in the best mode for carrying out the invention.

Industrial Applicability

The embodiments of the present invention are applicable to various wireless access systems. Examples of the various wireless access systems include 3rd Generation Partnership Project (3GPP), 3GPP2 and/or Institute of Electrical and Electronic Engineers 802 (IEEE 802.xx) systems. The embodiments of the present invention are applicable to all technical fields using the various wireless access systems in addition to the various wireless access systems.

The invention claimed is:

1. A method of retransmitting a management message in a Power Saving Class (PSC) mode, the method performed by a mobile station (MS) and comprising:

transmitting a first message including a first field indicating whether or not a fast retransmission scheme is supported to a base station;
receiving a second message including a second field indicating whether or not the fast retransmission scheme is supported from the base station;
transmitting the management message to the base station in an extended listening window of the PSC mode using a Hybrid Automatic Repeat request (HARQ) scheme; and
retransmitting the management message to the base station according to the fast retransmission scheme, when a number of received non-acknowledgments (NACKs) for the management message becomes equal to a maximum retransmission number of the HARQ scheme and the transmission of the management message using the HARQ scheme has failed,
wherein the fast retransmission scheme further extends the extended listening window so as to immediately retransmit the management message, when the HARQ scheme for the transmission of the management message has failed.

2. The method according to claim 1, wherein:
the first message is one of a Subscribe station basic capability request (SBC-REQ) message, a REGistration REQust (REG-REQ) message, and a SLeep REQuest (SLP-REQ) message, and
the second message is one of a Subscribe station basic capability response (SBC-RSP) message, a REGistration ReSPonse (REG-RSP) message and a SLeep ReSPonse (SLP-RSP) message corresponding to the first message.

3. The method according to claim 2, wherein the first message and the second message further include a first time field indicating an extension time duration of the extended listening window.

4. The method according to claim 3, wherein the retransmitting of the management message includes the mobile station retransmitting the management message by further extending the extended listening window according to the time duration indicated by the extension time duration field.

5. The method according to claim 3, wherein the first message and the second message further include a second time field indicating an extension time duration of the extended listening window in order to retransmit the management message using the HARQ scheme.

6. A method of retransmitting a management message in a Power Saving Class (PSC) mode, the method performed by a base station (BS) and comprising:
receiving a first message including a first field Indicating whether or not a fast retransmission scheme is supported from a mobile station;
transmitting a second message including a second field indicating whether or not the fast retransmission scheme is supported to the mobile station;
transmitting the management message to the mobile station in an extended listening window of the mobile station in the PSC mode using a Hybrid Automatic Repeat reQuest (HARQ) scheme; and
retransmitting the management message to the mobile station according to the fast retransmission scheme, when a number of received non-acknowledgments (NACKs) for the management message becomes equal to a maximum retransmission number of the HARQ scheme and the transmission of the management message using the HARQ scheme has failed,
wherein the fast retransmission scheme further extends the extended listening window so as to immediately retransmit the management message, when the HARQ scheme for the transmission of the management message has failed.

7. The method according to claim 6, wherein:
the first message is one of a Subscriber station basic capability request (SBC-REQ) message, a REGistration REQust (REG-REQ) message, and a SLeep REQuest (SLP-REQ) message, and
the second message is one of a Subscriber station basic capability response (SBC-RSP) message, a REGistration ReSPonse (REG-RSP) message and a SLeep ReSPonse (SLP-RSP) message corresponding to the first message.

8. The method according to claim 7, wherein the first message and the second message further include a first time field indicating an extension time duration of the extended listening window.

9. The method according to claim 8, wherein the retransmitting of the management message includes the base station retransmitting the management message by further extending the extended listening window according to the time duration indicated by the extension time duration field.

10. The method according to claim 8, wherein the first message and the second message further include a second time field indicating an extension time duration of the extended listening window in order to retransmit the management message using the HARQ scheme.

11. A mobile station for retransmitting a management message in a Power Saving Class (PSC) mode, the mobile station comprising:
a transmitter;
a receiver; and
a processor configured to control transmission and retransmission of the management message by using the transmitter and the receiver, the processor using a Hybrid Automatic Repeat reQuest (HARQ) scheme in the PSC mode, wherein the processor further extends an extended listening window according to a fast retransmission scheme so as to immediately retransmit the management message, when a number of received non-acknowledgments (NACKs) for the management message becomes equal to a maximum retransmission number of the HARQ scheme and the transmission of the management message according to the HARQ scheme has failed.

12. The mobile station according to claim 11, wherein the processor is configured to:
transmit a first message including a first field indicating whether or not the fast retransmission scheme is supported to a base station;
receive a second message including a second field indicating whether or not the fast retransmission scheme is supported from the base station;
transmit the management message to the base station in a listening window of the PSC mode using a Hybrid Automatic Repeat request (HARQ) scheme; and
retransmit the management message to the base station according to the fast retransmission scheme even though the transmission of the management message using the HARQ scheme has failed.

13. The mobile station according to claim 12, wherein:
the first message is one of a Subscriber station basic capability request (SBC-REQ) message, a REGistration REQust (REG-REQ) message,
and a SLeep REQuest (SLP-REQ) message, and the second message is one of a Subscriber station basic capability response (SBC-RSP) message, a REGistration ReSPonse (REG-RSP) message and a SLeep ReSPonse (SLP-RSP) message corresponding to the first message.

14. The mobile station according to claim 13, wherein the first message and the second message further include a first time field indicating an extension time duration of the extended listening window.

15. The mobile station according to claim 14, wherein the mobile station retransmits the management message by further extending the extended listening window according to the time duration indicated by the extension time duration field.

16. The mobile station according to claim 14, wherein the first message and the second message further include a second time field indicating an extension time duration of the extended listening window in order to retransmit the management message using the HARQ scheme.

* * * * *